(12) United States Patent
Xiao et al.

(10) Patent No.: US 12,192,929 B2
(45) Date of Patent: Jan. 7, 2025

(54) METHOD FOR REFERENCE SIGNAL TIME SYNCHRONIZATION AND CALIBRATION

(71) Applicant: ZTE Corporation, Guangdong (CN)

(72) Inventors: Huahua Xiao, Guangdong (CN);
Guozeng Zheng, Guangdong (CN);
Chuangxin Jiang, Guangdong (CN);
Zhaohua Lu, Guangdong (CN);
Shujuan Zhang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 385 days.

(21) Appl. No.: 17/858,317

(22) Filed: Jul. 6, 2022

(65) Prior Publication Data
US 2022/0353832 A1    Nov. 3, 2022

Related U.S. Application Data

(63) Continuation of application No. PCT/CN2020/107651, filed on Aug. 7, 2020.

(51) Int. Cl.
*H04W 56/00* (2009.01)
*H04L 5/00* (2006.01)

(52) U.S. Cl.
CPC ......... *H04W 56/001* (2013.01); *H04L 5/0048* (2013.01); *H04W 56/004* (2013.01)

(58) Field of Classification Search
None
See application file for complete search history.

(56) References Cited

U.S. PATENT DOCUMENTS

| | | |
|---|---|---|
| 2015/0264588 A1 | 9/2015 | Li et al. |
| 2018/0049047 A1 | 2/2018 | Lin et al. |
| 2018/0062724 A1* | 3/2018 | Onggosanusi ....... H04B 7/0478 |
| 2018/0192384 A1* | 7/2018 | Chou .................... H04W 76/27 |
| 2019/0174554 A1* | 6/2019 | Deenoo ................ H04L 5/0098 |
| 2020/0235877 A1 | 7/2020 | Manolakos et al. |

FOREIGN PATENT DOCUMENTS

| | | |
|---|---|---|
| WO | WO 2016/181198 A1 | 11/2016 |
| WO | WO 2018/064407 A1 | 4/2018 |
| WO | WO 2019/164430 A1 | 8/2019 |
| WO | WO 2019/242635 A1 | 12/2019 |

OTHER PUBLICATIONS

International Search Report mailed May 6, 2021 for International Application No. PCT/CN2020/107651.
Written Opinion mailed May 6, 2021 for International Application No. PCT/CN2020/107651.

* cited by examiner

*Primary Examiner* — Shripal K Khajuria
(74) *Attorney, Agent, or Firm* — Crowell & Moring LLP

(57) ABSTRACT

This disclosure describes methods and systems for configuring, requesting, performing, and reporting timing measurements of reference signals in a wireless network for purposes of time synchronization between various reference signal transmission-reception points of the wireless network. The reference signal timing measurements may be used to derive time offsets for performing time synchronization and calibration of the transmission-reception points that help improve geographical positioning of wireless devices in the wireless network.

20 Claims, 2 Drawing Sheets

METHOD FOR REFERENCE SIGNAL TIME SYNCHRONIZATION AND CALIBRATION

CROSS REFERENCE

This application is a continuation of and claims priority to International Patent Application No. PCT/CN2020/107651, filed Aug. 7, 2020, which is herein incorporated by reference in its entirety.

TECHNICAL FIELD

This disclosure is directed to reference signal timing measurements, synchronization, and calibration in wireless communication networks.

BACKGROUND

Wireless communication technologies are moving the world towards a rapidly increasing network connectivity. In many applications, such as Industrial Internet of Things (IIoT) and V2X applications (including vehicle-to-infrastructure, vehicle-to-network, vehicle-to-pedestrian applications, and the like), it may be desirable to accurately determine locations of various wireless network nodes and devices. Estimation of positions of the wireless network nodes or devices of the wireless communication network, for example, may be based on determining propagation times of reference signals between the wireless network nodes and devices. Such determination of the propagation times of the reference signals may be based on measurements of transmission and reception times of the reference signals in different local time frames as reported by the various network nodes and devices. The reference signal propagation times determined in such a manner become distorted when different local time frames of the network nodes and devices are out of synchronization and time offsets therebetween are unknown, leading to errors in the position estimation.

SUMMARY

This disclosure describes reference signal timing measurements, synchronization, and calibration in wireless communication networks.

In one implementation, a method performed by a network node for reference signal synchronization in a wireless network is disclosed. The method includes sending reference signal configuration information to a first transmission reception point (TRP 1) and a second transmission reception point (TRP 2) of the wireless network; sending measurement requests to trigger the TRP 1 and/or the TRP 2 to perform timing measurements of reference signals communicated between the TRP 1 and the TRP 2 according to the reference signal configuration information; receiving, from the TRP 1 and/or the TRP 2, measurement reports of the timing measurements; and generating time offset information for synchronizing between the TRP 1 and the TRP 2.

In the implementation above, the network node may include a reference signal scheduling entity and the TRP 1 and TRP 2 include wireless base stations.

In any one of the implementations above, the reference signal configuration information may include at least one of transmission periodicity, transmission radio resource information, sequence information, transmission and/or reception scheduling information, initialization time information of system frame number (SFN), or transmission and/or reception beam information of the reference signals communicated between the TRP 1 and the TRP 2.

In any one of the implementations above, the transmission and/or reception scheduling information of each of the reference signals comprises at least one of a SFN, a sub-frame number, a slot number, a symbol number, a mini slot number, a symbol number, or a symbol index.

In any one of the implementations above, the transmission radio resource information comprises at least one of radio frequency, radio frequency bandwidth, or sub-carrier spacing for each of the reference signals.

In any one of the implementations above, the transmission and/or reception beam information of each of the reference signals comprises a spatial filter. In any one of the implementations above, each of the measurement requests comprises at least one of a measurement periodicity, a measurement type, a measurement time resolution, or a reference signal identifier. In any one of the implementations above, the measurement type indicates which timing values of the reference signals need to be measured and reported by the TRP 1 and TRP 2.

In any one of the implementations above, each of the measurement reports may include at least one of a reference signal measurement time value, corresponding reference signal identifier, a measurement time stamp, a measurement quality metrics, or a measurement time resolution.

In any one of the implementations above, measurement time stamp may include at least one of a system frame number, a subframe number, a slot number, a mini slot number, a symbol number, or a symbol index. In any one of the implementations above, the measurement quality metrics comprises at least one of mean value or standard deviation of multiple measurements, or measurement confidence level.

In any one of the implementations above, the reference signals as scheduled by the reference signal configuration information may include a first reference signal (RS 1) transmitted from the TRP 1 at time $T_{trp1,RS1,tx}$ as measured by TRP 1 and received by the TRP 2 at time $T_{trp2,RS1,rx}$ as measured by TRP 2; and a second reference signal (RS 2) transmitted from the TRP 2 at time $T_{trp2,RS2,tx}$ as measured by the TRP 2 and received by the TRP 1 at time $T_{trp1,RS2,rx}$ as measured by TRP 1.

In any one of the implementations above, the measurement report from the TRP 1 may include at least one of $T_{trp1,RS1,tx}$, $T_{trp1,RS2,rx}$, or $T_{trp1,RS2,rx}-T_{trp1,RS1,tx}$; and the measurement report from the TRP 2 comprises at least one of $T_{trp2,RS2,tx}$, $T_{trp2,RS1,rx}$, or $T_{trp2,RS2,tx}-T_{trp2,RS1,rx}$. Furthermore, generating the time offset may include generating the time offset for synchronizing the TRP 1 and the TRP 2 based on at least one of $T_{trp1,RS1,tx}$, $T_{trp1,RS2,rx}$, $T_{trp2,RS2,tx}$, and $T_{trp2,RS1,rx}$. In any one of the implementations above, the time offset is derived by the network node as $[(T_{trp2,RS1,rx}-T_{trp1,RS1,tx})-(T_{trp1,RS2,rx}-T_{trp2,RS2,tx})]/2$.

In any one of the implementations above, the time offset is derived by the network node as $E_{sync\_12}=T_{trp1,RS2,rx}-T_{trp2,RS2,tx}-R_{12}/c$ or $E_{sync\_21}=T_{trp2,RS1,rx}-T_{trp1,RS1,tx}-R_{12}/c$, where $R_{12}$ denotes a distance between the TRP 1 and TRP 2, and c represents signal propagation speed of the reference signals between the TRP 1 and the TRP 2.

In some other implementations, a method performed by a network node for reference signal synchronization in a wireless network is disclosed. The method may include sending reference signal configuration information to a first transmission reception point (TRP 1), a second transmission reception point (TRP 2), and a third transmission reception point (TRP 3) of the wireless network; sending measurement requests to trigger the TRP 1, the TRP 2, and/or the TRP 3 to perform timing measurements of reference signals communicated between the TRP 1, and the TRP 2 and the TRP 3 according to the reference signal configuration information; receiving, from the TRP 1, TRP 2, and/or the TRP 3, measurement reports of the timing measurements; and generating time offset information for synchronizing the TRP 1, the TRP 2, and the TRP 3.

In any one of the implementations above, the reference signals as scheduled by the reference signal configuration information may include a first reference signal (RS 1) transmitted from the TRP 1 at time $T_{trp1,RS1,tx}$ as measured by the TRP 1, and received by the TRP 2 at time $T_{trp2,RS1,rx}$ as measured by the TRP 2 and by the TRP 3 at time $T_{trp3,RS1,rx}$ as measured by the TRP 3; a second reference signal (RS 2) transmitted from the TRP 2 at time $T_{trp2,RS2,tx}$ as measured by the TRP 2 and received by the TRP 1 at time $T_{trp1,RS2,rx}$ as measured by the TRP 1; and a third reference signal (RS 3) transmitted from the TRP 3 at time $T_{trp3,RS3,tx}$ as measured by the TRP 3 and received by the TRP 1 at time $T_{trp1,RS3,rx}$ as measured by the TRP 1.

In any one of the implementations above, the measurement report from the TRP 1 may include at least one of $T_{trp1,RS1,tx}$, $T_{trp1,RS2,rx}$, or $T_{trp1,RS2,rx}-T_{trp1,RS1,tx}$; the measurement report from the TRP 2 comprises at least one of $T_{trp2,RS2,tx}$, $T_{trp2,RS1,rx}$, or $T_{trp2,RS2,tx}-T_{trp2,RS1,rx}$; and the measurement report from the TRP 3 comprises at least one of $T_{trp3,RS1,rx}$, $T_{trp3,RS3,tx}$ or $T_{trp3,RS3,tx}-T_{trp3,RS1,rx}$.

In any one of the implementations above, generating the time offset may include generating the time offset for synchronizing the TRP 2 and the TRP 3 based on at least one of $T_{trp1,RS1,tx}$, $T_{trp1,RS2,rx}$, $T_{trp2,RS2,tx}$, $T_{trp2,RS1,rx}$, $T_{trp3,RS3,tx}$, $T_{trp3,RS1,rx}$, and a reference signal time delay between RS 2 and RS 3 as measured by the TRP 1 and denoted by $T_{trp2,trp3,RSTD}$.

In any one of the implementations above, the time offset for synchronizing the TRP 2 and the TRP 3 is derived by the network node as:

$$E_{sync\_32} = \frac{(T_{trp1,RS3,RS1} - T_{trp3,RS3,RS1}) - (T_{trp1,RS2,RS1} - T_{trp2,RS2,RS1})}{2} - T_{trp2,trp3,RSTD},$$

Where:

$T_{trp1,RS3,RS1} = T_{trp1,RS3,rx} - T_{trp1,RS1,tx}$;

$T_{trp3,RS3,RS1} = T_{trp3,RS3,tx} - T_{trp3,RS1,rx}$;

$T_{trp1,RS2,RS1} = T_{trp1,RS2,rx} - T_{trp1,RS1,tx}$; and $T_{trp2,RS2,RS1} = T_{trp2,RS2,tx} - T_{trp2,RS1,rx}$.

In any one of the implementations above, the time offset for synchronizing the TRP 2 and the TRP 3 is derived by the network node as $E_{sync\_32}=(R_{13}-R_{12})/c-T_{trp2,trp3,RSTD}$, where $R_{12}$ denotes a distance between the TRP 1 and TRP 2; $R_{13}$ denotes a distance between the TRP 1 and TRP 3; and c represents signal propagation speed of the reference signals between the TRP 1, the TRP 2, and the TRP 3.

Various network nodes or devices are further disclosed. Each of these network nodes or devices includes a processor, wherein the processor is configured to implement any one of the methods above.

Computer-readable media are further disclosed. Such a computer-readable medium includes instructions which, when executed by a computer, cause the computer to carry out any one of the methods above.

The above embodiments and other aspects and alternatives of their implementations are described in greater detail in the drawings, the descriptions, and the claims below.

DETAILED DESCRIPTION

Figure 1:
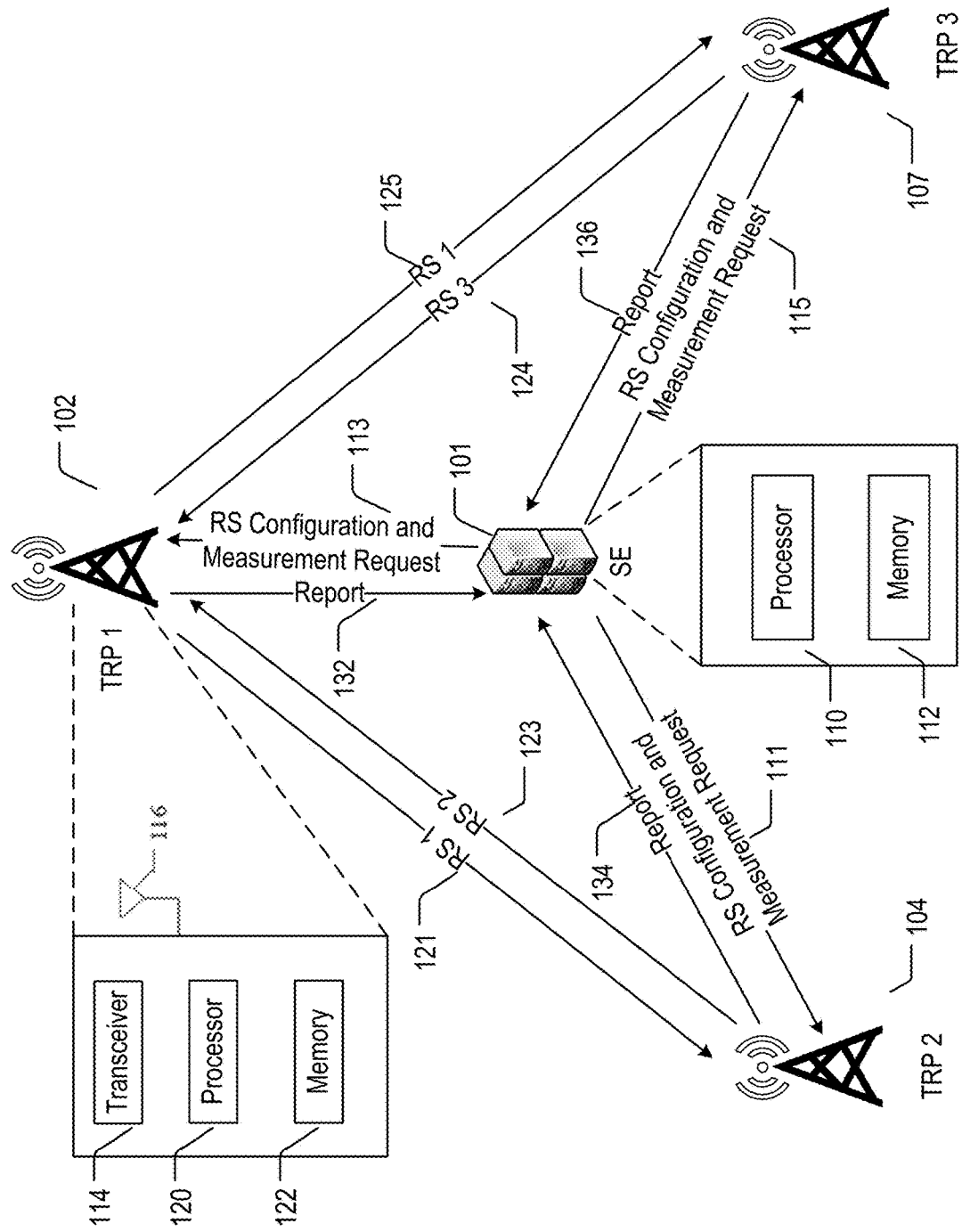
FIG. 1 shows various network nodes in a portion of a wireless communication network configured to communicate wireless reference signals and configuration information thereof.

The technology and examples of implementations and/or embodiments in this disclosure can be used to improve performance of virtual networks in communication systems. The term "exemplary" is used to mean "an example of" and unless otherwise stated, does not imply an ideal or preferred example, implementation, or embodiment. The implementations may be embodied in a variety of different forms and, therefore, the scope of this disclosure or claimed subject matter is intended to be construed as not being limited to any of the embodiments set forth below. The various implementations may be embodied as methods, devices, components, or systems. Accordingly, embodiments of this disclosure may, for example, take the form of hardware, software, firmware or any combination thereof.

By way of introduction, many applications in new generations of wireless communication networks require high-accuracy geographic positioning of various network devices. Such applications include but are not limited to Industrial Internet of Things (IIoT) and V2X applications (including vehicle-to-infrastructure, vehicle-to-network, vehicle-to-pedestrian applications, and the like).

Geographical positions of a wireless network device (either mobile or fixed) may be obtained using hyperbolic, triangulation, or other methods by first determining its distances to other network devices having known locations. Such distances, for example, may be obtained by measuring times of flight of wireless signals transmitted between the network devices. Wireless signals designed for time of flight measurements may be referred to as reference signals (those having ordinary skill in the art understand that such reference signals may be designed to have purposes other than timing measurements, such as power control). In particular, assuming a direct line-of-sight wireless signal propagation, a distance between two wireless devices may be estimated by multiplying a time of flight of a reference signal communicated between the two wireless devices with a propagation speed of the reference signal (e.g., nearly speed of light, denoted by c).

In order to determine a time of flight of a reference signal, both a time of transmission of the reference signal from a first transmitting network device and a time of reception of the reference signal by a second receiving network device are needed. The transmission time and reception time may be measured, recorded, and reported by the first and second network devices, respectively.

The reference signal transmission or reception time may be measured relative to local time frames of the first transmitting network device and second receiving network device, respectively. These local time frames may not be synchronized with sufficient accuracy. As such, a time of flight as determined by a difference between a reception time of the reference signal as measured using one local time frame and a transmission time of the same reference signal as measured using another local time frame, referred to as an apparent time of flight, may include (or be embedded with) a time offset between the two local time frames due to desynchronization. If left unaccounted for, this time offset would result in a deviation or an error of the measured apparent time of flight from a corresponding true (or actual) time of flight. Such deviation may further lead to an unacceptable error in position estimation. The apparent time of flight may be calibrated to obtain the true time of flight of the reference signal for more reliable position estimate by accounting for the time offset between the local time frames of the reference signal transmission and reception devices.

In wireless networks such as the fourth generation (4G) and fifth generation (5G) cellular networks, the determination of time offsets between local time frames is particularly important for base stations. Specifically, because positioning of all mobile devices is generally based on triangulation with two or more base stations (or other reference signal transmission points) with known locations and relies on reference signal time differences (RSTDs) representing time differences of arrivals of reference signals from the two or more base stations at the mobile devices, the time offsets between the local time frames of these base stations cannot be ignored and need to be constantly monitored and accounted for to achieve high-accuracy positioning of the mobile devices.

This disclosure generally relates to methods, devices, and systems for configuring, scheduling, and reporting timing measurements of reference signals transmitted and received among various transmission-reception points, alternatively referred to as network nodes, of a wireless communication network, and for purposes of reference signal time synchronization and calibration based on the timing measurements. While the example embodiments below may be provided at times in the context of base station synchronization/time-offset estimation in 4G or 5G cellular networks for the specific purpose of improving location estimation accuracy, the underlying principles of this disclosure are generally applicable to fixed or mobile wireless network nodes or devices other than base stations and to wireless infrastructures of than 4G or 5G networks, and for other purposes requiring synchronization of reference signals.

FIG. 1 shows various network nodes in a portion of a wireless network including network nodes in the form of three transmission-reception points (TRPs) TRP 1 (102), TRP 2 (104), and TRP 3 (107) in communication with one another wirelessly and further in communication with a reference signal (RS) scheduling entity (SE) 101. The SE 101 may communicate with the TRPs in any manners and via any communication channels. The SE may be centralized or distributed in the wireless network.

In the context of 4G (including LTE) or 5G cellular network, the TRPs 102, 104, and 107 may include base stations and other wireless access points within a radio access network (RAN), such as a 4G base station, 5G NR base station, a 5G central-unit base station, or a 5G distributed-unit base station (the various 5G base stations may be alternatively referred to as next generation nodeB, or gNB). Each type of these TRPs, using TRP 1 as an example in FIG. 1, may include a transceiver circuitry 114 coupled to one or more antennas 116 to effectuate wireless communications with user equipment (not shown in FIG. 1) and other TRPs. The transceiver circuitry 114 may be coupled to one or more processors 120, which may further be coupled to a memory 122 or other storage devices. The memory 122 may store therein instructions or code that, when read and executed by the processor 120, cause the processor 120 to implement various network functions. These network functions, for example, may include those related to reference signal time synchronization and calibration described below.

Further in the context of 4G or 5G cellular network, the SE 101 may be implemented as one or more location servers or units or any other network node. The SE 101 may be part of a core network or part of the RAN. For example, the SE 101 may be integrated with any core network functions. Alternatively, the SE 101 may be implemented as a processing unit within any of the TRPs. The SE 101, as shown in FIG. 1, may include one or more processors 110, which may further be coupled to a memory 112 or other storage devices. The memory 112 may store therein instructions or code that, when read and executed by the processor 110, cause the processor 110 to implement various network functions. These network functions, for example, may include may include those related to reference signal time synchronization and calibration described below.

In some implementations, as shown by 111, 113, and 115 of FIG. 1, the SE 101 may transmit RS configuration information to the TRPs 102, 104, and 107. The SE 101 may further transmit RS timing measurement requests to the TRPs 102, 104, and 107, when time calibration and synchronization between the local time frames of the TRPs are determined by the SE 101 or other network elements as needed, as also shown by 111, 113, and 115 of FIG. 1. Alternatively, SW 101 may transmit the RS time measurement requests periodically or at any scheduled times.

Upon receiving the RS configuration information and RS timing measurement requests form the SE 101, the TRPs 102, 104, and 107 may transmit and receive reference signals therebetween according to the RS configuration information. For example, as shown by 121 and 125 of FIG. 1, TRP 1 (102) may transmit a first reference signal RS 1 as scheduled, and RS 1 may be subsequently received by TRP 2 (104) and TRP 3 (107). In response to receiving RS 1 or spontaneously, TRP 2 (104) and TRP 3 (107) may transmit to TRP 1 (102), as scheduled, reference signals RS 2 and RS 3, respectively, as shown by 123 and 124 of FIG. 1. The TRPs may receive these reference signals, determine and record the arrival times of the reference signals RS 1, RS 2, and RS 3 relative to their respective local time frames.

Figure 2:
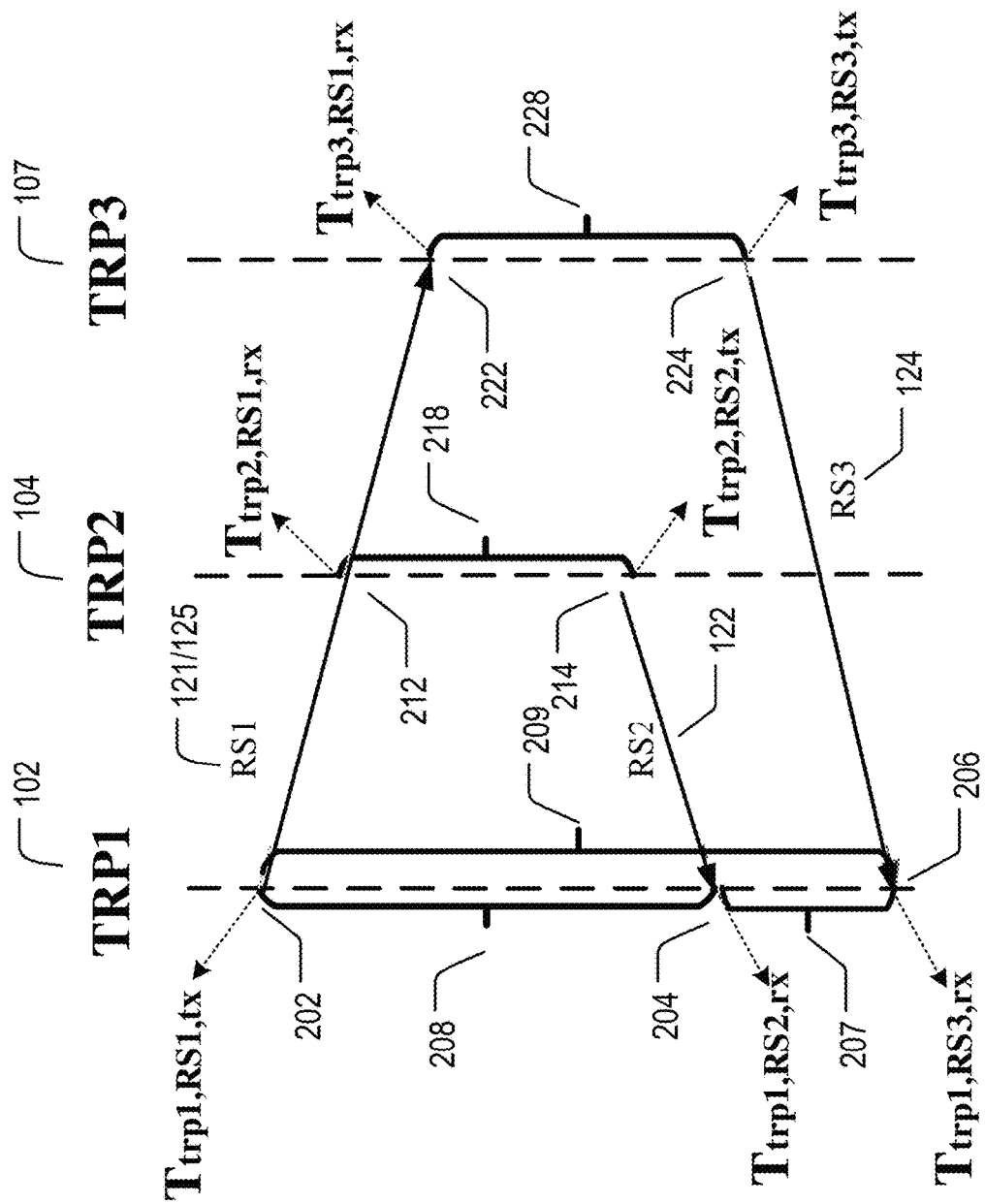
FIG. 2 illustrates timing of reference signal transmission and reception between various network reception points of the wireless communication network of FIG. 1.

The TRPs 102, 104, and 107, following the timing measurement, may report the various transmission and reception times of the reference signals RS 1, RS 2, and RS 3 and other information to the SE 101, as shown by 132, 134, and 136 of FIG. 2. The SE 101, upon receiving the reports from TRPs 102, 104, and 107, may proceed to analyze the reported timing information and other information to estimate time offsets between the local time frames of the TRPs 102, 104, and 107.

Details entailed in the various steps performed by the SE 101 and the TRPs 102, 104, and 107 as described above and illustrated in FIG. 2 are further provided below. While three different TRPs are illustrates as an example in FIG. 1, any other number of TRPs may be include and distributed in the wireless communication network 100.

RS Configuration Information

The RS configuration information transmitted from the SE 101 to TRP 1, TRP 2 and TRP 3 is intended to provide scheduling, radio resource, and signal configuration of reference signals to the TRPs. The RS configuration information may be communicated to the TRPs via any communication channels and in forms of any system messages. Such messages may contain information including but not limited to at least one of the following information items:

Periodicity of reference signals;

RF frequency (logical or physical) of the reference signals;

RF bandwidth of the reference signals;

Spacing of sub-carriers used for transmitting the reference signals,

Sequence (e.g., OFDM symbol sequence) of the reference signals;

Scheduled transmission times for the reference signals in, e.g., system frame numbers (SFNs), subframe numbers, slot number, mini slot number, and symbol number or symbol index (e.g., OFDM symbol number) within the slot corresponding to the reference signal transmission time;

Scheduled reception time for the reference signals in, e.g. system frame numbers (SFNs), subframe numbers, slot number, min slot number, and symbol number or index (e.g., OFDM symbol number) within the slot corresponding to the reference signal reception time;

SFN initialization time, e.g. the Coordinated Universal Time (UTC) of the TRPs; or Beam information for the reference signal transmission and reception, e.g. spatial filters. Spatial filters for the receiving a reference signal and transmitting another reference signal by a same TRP may be the same. For example, a spatial filter for TRP 1 of FIG. 1 to transmit RS 1 and receiving RS 2 may be the same, and a spatial filter for TRP 2 to receive RS 1 and transmit RS 2 may be the same. A spatial filter information may include any one of Quasi Co-Location (QCL) information, QCL type D information, Transmission Configuration Indicator (TCI), Sounding Reference Signal (SRS) resource indicator, Channel State Information Reference Signal (CSI-RS) resource Indicator, beam group indicator, TCI state information, or TCI state group information.

The RS configuration information above provides a basis for the TRPs to schedule and configure their reference signal transmission and reception.

RS Timing Measurement Request

The RS timing measurement requests transmitted from the SE 101 to TRP 1, TRP 2 and TRP 3 are intended to trigger RS timing measurements and reporting. The RS timing measurement requests may be communicated to the TRPs via any communication channels and in forms of any system messages. The RS timing measurement requests may be communicated together with or separately from the RS configuration information messages. The RS timing measurement requests contain information including but not limited to at least one of RS measurement periodicity, RS measurement types (e.g. specify timing values need to be measured and reported), RS timing measurement resolution, RS index identifying reference signals to be measured (e.g. the transmitted RS 1 from TRP 1 and received RS 1 by TRP 2 in FIG. 1 should be identified by the same RS index).

Timing Measurements by the TRPs

Upon receiving the RS configuration information and RS timing measurement requests form the SE 101, the TRPs 102, 104, and 107 may transmit and receive reference signals 121, 125, 123, and 124 as shown in FIG. 1. Each of the TRPs 102, 104, and 107 may measure time(s) at which it transmits one or more reference signals and time(s) at which it receives one or more reference signals. These times are measured relative the local time frame of each of the TRPs 102, 104, and 107.

FIG. 2 illustrates example timing of reference signal transmission and reception between the TRPs 102, 104, and 107 of FIG. 1. The various local reference signal transmission and reception times are listed below:

$T_{trp1,RS1,tx}$: RS 1 transmission time at TRP 1, as shown by 202 in FIG. 2;

$T_{trp2,RS1,rx}$: first detected reception time of RS 1 at TRP 2, as shown by 212 in FIG. 2;

$T_{trp3,RS1,rx}$: first detected reception time of RS 1 at TRP 3, as shown by 222 in FIG. 2;

$T_{trp2,RS2,tx}$: RS 2 transmission time at TRP 2, as shown by 214 in FIG. 2;

$T_{trp3,RS3,tx}$: RS 3 transmission time at TRP 3, as shown by 224 in FIG. 2;

$T_{trp1,RS2,rx}$: first detected reception time of RS 2 at TRP 1, as shown by 204 in FIG. 2; and $T_{trp1,RS3,rx}$: first detected reception time of RS 3 at TRP 1, as shown by 206 in FIG. 2.

Various differences between the local transmission times and receptions times at the TRPs above are further illustrated in FIG. 2 and listed below:

$T_{trp1,RS2,RS1}$: reception and transmission time difference between RS 2 and RS 1 at TRP 1, i.e., $T_{trp1,RS2,rx} - T_{trp1,RS1,tx}$, as indicated by 208 in FIG. 2;

$T_{trp1,RS3,RS1}$: reception and transmission time difference between RS 3 and RS 1 at TRP 1, i.e., $T_{trp1,RS3,rx} - T_{trp1,RS1,tx}$, as indicated by 209 in FIG. 2;

$T_{trp2,RS2,RS1}$: transmission and reception time difference between RS 2 and RS 1 at TRP 2, i.e., $T_{trp2,RS2,tx} - T_{trp2,RS1,rx}$, as indicated by 218 in FIG. 2; and $T_{trp3,RS3,RS1}$: transmission and reception time difference between RS 3 and RS 1 at TRP 3, i.e., $T_{trp3,RS3,tx} - T_{trp3,RS1,rx}$, as indicated by 228 in FIG. 2.

A time difference for reception times of RS 2 and RS 3 at the TRP 1 may be expressed as $T_{trp1,(trp2,trp3)diff}$, where $T_{trp1,(trp2,trp3)diff} = T_{trp1,RS3,RS1} - T_{trp1,RS2,RS1}$ or $T_{trp1,RS3,rx} - T_{trp1,RS2,rx}$ as indicated by 207 of FIG. 1. This time difference is essentially equivalent to an RSTD as measured by the TRP 1 based on reference signals transmitted from the TRP 2 and the TRP 3, as denoted by $T_{trp2,trp3,RSTD}$. This RSTD is essentially the relative timing difference between the TRP 3 and TRP 2 further defined as $T_{SubframeRx3} - T_{SubframeRx2}$. Where $T_{SubframeRx3}$ is the time when the TRP 1 receives the start of one subframe from TRP 3, and $T_{SubframeRx2}$ is the time when the TRP 1 receives the corresponding start of one subframe from TRP 2 that is closest in time to the subframe received from TRP 3.

Measurement Report

After performing the reference signal timing measurements, the TRPs may report the measurements to the SE 101. The RS timing measurement reports may be communicated to the SE 101 via any communication channels and in forms of any system messages. The reports may contain various inform items. For example, the RS timing measurement report from the TRP 1 in the configuration of FIGS. 1 and 2 may contain information including but not limited to at least one of the following items:

Timing value including at least one of $T_{trp1,RS1,tx}$, $T_{trp1,RS2,rx}$, $T_{trp1,RS3,rx}$, $T_{trp1,RS2,RS1}$, $T_{trp1,RS3,RS1}$, $T_{trp2,trp3,RSTD}$, or $T_{trp1,(trp2,trp3)diff}$;

RS index or indexes identifying the measured reference signals;

Time stamps for the measurements (e.g. system frame number, subframe number, slot number, mini slot number, and symbol number/index where the measurements are performed);

Measurement quality metrics (e.g. when the measurements are acquired from multiple reference signal receptions, the measurement quality metrics may include, for example, the mean value and/or the standard deviation of the measurements, or confidence level of the measurements); or Timing resolution for the RS timing measurements.

For another example, the RS timing measurement report from the TRP 2 in the configuration of FIGS. 1 and 2 may contain information including but not limited to at least one of the following items:

Timing value, including at least one of $T_{trp2,RS1,rx}$, $T_{trp2,RS2,tx}$, or $T_{trp2,RS2,RS1}$ RS index or indexes identifying the measured reference signals;

time stamps for the measurements (e.g. system frame number, subframe number, slot number, mini slot number, and symbol number/index where the measurements are performed);

Measurement quality metrics (e.g. when the measurements are acquired from multiple reference signal receptions, the measurement quality metrics may include, for example, the mean value and/or the standard deviation of the measurements, or confidence level of the measurements); or Timing resolution for the RS timing measurements.

For yet another example, the RS timing measurement report from the TRP 2 in the configuration of FIGS. 1 and 2 may contain information including but not limited to at least one of the following items:

Timing value including at least one of $T_{trp3,RS1,rx}$, $T_{trp3,RS3,tx}$, or $T_{trp3,RS3,RS1}$ RS index or indexes identifying the measured reference signals;

Time stamps for the measurements (e.g. system frame number, subframe number slot number, mini slot number, and symbol number/index where the measurements are performed);

Measurement quality metrics (e.g. when the measurements are acquired from multiple reference signal receptions, the measurement quality metrics may include, for example, the mean value and/or the standard deviation of the measurements, or confidence level of the measurements); or Timing resolution for the RS timing measurements.

Synchronization Time Offset Estimation

The SE 101, upon receiving the RS measurement reports from TRPs 102, 104, and 107, may proceed to analyzing the reported timing information in local time frames of TRPs 102, 104, and 107 to estimate time offsets between these local time frames.

Method One

In some example implementations, the synchronization time offset between the local time frames of the TRP 1 and the TRP 2 may be estimated by the SE 101 as:

$$E_{sync\_12} = T_{trp1,RS2,rx} - T_{trp2,RS2,tx} - \frac{T_{trp1,RS2,RS1} - T_{trp2,RS2,RS1}}{2},$$

or $$E_{sync\_21} = T_{trp2,RS1,rx} - T_{trp1,RS1,tx} - \frac{T_{trp1,RS2,RS1} - T_{trp2,RS2,RS1}}{2}.$$

As illustrated in FIG. 2, the manner in which the relative time offsets between the local time frames of the TRP1 and the TRP 2 are determined above with the following considerations:

The measured apparent time of flight of RS 1 from the TRP 1 to the TRP 2 as represented by $T_{trp2,RS1,rx} - T_{trp1,RS1,tx}$ includes both the corresponding actual time of flight of RS 1 and the TRP2–TRP1 local time frame offset;

The measured apparent time of flight of RS 2 from the TRP 2 to the TRP 1 as represented by $T_{trp1,RS2,rx} - T_{trp2,RS2,tx}$ includes both the corresponding actual time of flight of RS 2 and the TRP1–TRP2 local time frame offset;

The term $(T_{trp1,RS2,RS1} - T_{trp2,RS2,RS1})/2$ represents difference between 208 and 218 of FIG. 2 divided by 2, and further represents an average of the two apparent times of flights above for RS 1 and RS 2. Such an average removes the relative time offset between the local time frames of the TRP 1 and the TRP 2;

The actual time of flight (or alternatively, the true time of flight) for RS 1 from TRP 1 to TRP 2 and the actual time of flight for RS 2 from the TRP 2 to the TRP 1 are the same assuming the TPR1-to-TRP 2 wireless transmission path and the Reverse TRP 2-to-TRP 1 wireless transmission path are identical;

The Average of the two apparent times of flights $(T_{trp1,RS2,RS1} - T_{trp2,RS2,RS1})/2$ thus represents the actual time of flight of RS 1 or RS 2 between the TRP 1, and the TRP 2 with the time offset removed; and The difference between the apparent times of flight and the actual times of flight thus provides the relative time offset between the local time frames of the TRP 1 and the TRP 2, as indicated by the time offset equations above.

Likewise, the synchronization offset between the local time frames of the TRP 1 and the TRP 3 can be estimated by the SE 101 with similar assumptions above as:

$$E_{sync\_13} = T_{trp1,RS3,rx} - T_{trp3,RS3,tx} - \frac{T_{trp1,RS3,RS1} - T_{trp3,RS3,RS1}}{2},$$

or $$E_{sync\_31} = T_{trp3,RS1,rx} - T_{trp1,RS1,tx} - \frac{T_{trp1,RS3,RS1} - T_{trp3,RS3,RS1}}{2}.$$

In the implementations above, the time offset calculations are applicable regardless of whether the actual reference signal transmission paths between the TRPs are line-of-sight (LOS) paths as long as the forward paths and the corresponding backward paths between each a pair of TRPs are identical. In other words, these reference signal transmission paths can be non-line-of-sight (NLOS) paths and the time offset calculations above still applies. In a practical wireless communication network, the TRPs in the form of base stations, may be designed and configured to communicate with line-of sight path therebetween anyway.

Method Two

In some other implementations, exact relative distance between the TRP 1 and the TRP2 denoted as $R_{12}$ may be known. As such, the time offset between local time frames of the TRP 1 and the TRP 2 may be estimated by the SE 101 as:

$$E_{sync\_12} = T_{trp1,RS2,rx} - T_{trp2,RS2,tx} - R_{12}/c$$

or $$E_{sync\_21} = T_{trp2,RS1,rx} - T_{trp1,RS1,tx} - R_{12}/c$$

where c denotes the speed of reference signal transmission speed.

In the implementations above, it is assumed that the TRP 1 and the TRP 2 transmit and receive reference signals in line-of-sight so that the apparent times of flight in the equations above are only affected by the time offset and are not affected by any NLOS. This would be most likely the case for TRPs in the form of base stations because a wireless network is typically designed to maintain direct LOS for base stations. The above implementations still applies in the presence of NLOS as long as the NLOS path is sufficiently similar to direct LOS path (with a difference in the order of the positioning accuracy requirement or less).

Likewise, when exact relative distance between the TRP 1 and the TRP3 denoted as $R_{13}$ is known, the synchronization time offset between local time frames of the TRP 1 and the TRP 3 may be estimated by the SE 101 as:

$$E_{sync\_13} = T_{trp1,RS3,rx} - T_{trp3,RS3,tx} - R_{13}/c,$$

or $$E_{sync\_31} = T_{trp3,RS1,rx} - T_{trp1,RS1,tx} - R_{13}/c.$$

It is assumed for this estimation that the TRP 1 and TRP 3 transmit and receive reference signals in line-of-sight so that the apparent times of flight in the equations above are not only affected by the time offset and are not affected by any NLOS, which would be most likely the case for TRPs in the form of base stations. The above implementations still applies in the presence of NLOS as long as the NLOS path is sufficiently similar to direct LOS path (with a difference in the order of the positioning accuracy requirement or less).

Method Three

In some implementations, the time offset between local time frames of the TRP 2 and the TRP 3 may be estimated if the exact relative distance between the TRP 1 and the TRP 2 (denoted by $R_{12}$), and the exact relative distance between the TRP 1 and the TRP 3 (denoted by $R_{13}$) are known to the SE 101, even though no reference signals are sent between the TRP 2 and the TRP 3 according to FIG. 2. In particular, the synchronization offset between the TRP 2 and the TRP 3 can be estimated by the SE 101 as:

$$E_{sync\_32} = (R_{13} - R_{12})/c - T_{trp2,trp3,RSTD}.$$

Essentially, in the equation above, the first term represents the relative reference signal delay time between the TRP 2 and the TRP 3 at TRP 1 without any time offset between the TRP 2 and the TRP 3. The second term represents the signal delays as measured by the TRP 1 which includes time offset between the local time frames of the TRP 2 and the TRP 3. The difference between these two terms is thus the time offset between the local time frames of the TRP 2 and TRP 3.

Similar to Method Two above, this method assumes that the impact from any NLOS signal paths is negligible with respect a required positioning accuracy.

Method Four

In some implementations, the synchronization time offset between the local time frames of the TRP 2 and the TRP 3 may be estimated by the SE 101 as:

$$E_{sync\_32} = \frac{(T_{trp1,RS3,RS1} - T_{trp3,RS3,RS1}) - (T_{trp1,RS2,RS1} - T_{trp2,RS2,RS1})}{2} - T_{trp2,trp3,RSTD}$$

In the estimation above, the term $(T_{trp1,RS2,RS1} - T_{trp2,RS2,RS1})/2$, or difference between 208 and 218 of FIG. 2, is identical to the last term of TRP 1-TRP 2 time offset estimate in Method One, and as discussed above with respect to Method One, corresponds to actual time of flight of reference signals between TRP 1 and TRP 2. Likewise, the term $(T_{trp1,RS3,RS1} - T_{trp3,RS3,RS1})/2$, or a difference between 209 and 228 of FIG. 2, represents actual time of flight of reference signal transmitted between TRP 1 and TRP 3, similar to the last term of TRP 1-TRP 3 time offset estimate in Method One. As such, the term $[(T_{trp1,RS2,RS1} - T_{trp2,RS2,RS1}) - (T_{trp1,RS3,RS1} - T_{trp3,RS3,RS1})]/2$ of the TRP 2-TRP 3 time offset estimate above represents the RSTD of reference signals transmitted from the TRP 2 and the TRP 3 at the TRP 1 with the time offset between the TRP 2 and TRP 3 removed. Therefore its difference from the measured RSTD, denoted as $T_{trp2,trp3,RSTD}$ above would provide the synchronization time offset between TRP 2 and TRP 3, as shown in the equation above.

Like Method One, in the implementations of Method Four above, the time offset calculations are applicable regardless of whether the actual reference signal transmission paths between the TRPs are line-of-sight (LOS) paths as long as the forward paths and the corresponding backward paths between each a pair of TRPs are identical except reversed. In other words, these reference signal transmission paths can be non-line-of-sight (NLOS) paths and the time offset calculations above still applies. In a practical wireless communication network, TRPs in the form of base stations, may be designed and configured to communicate with line-of sight path anyway.

In the various implementations and methods above, only behaviors of two or three TRPs are described. The underlying principles can be extended to perform synchronization between any number of TRPs. As such, all TRPs can be synchronized. For example, while Method One and Method Two above are directed to determining synchronization offset between TRP 1 and TRP2, these methods may be used to similarly determine synchronization offset between any TRP i and TRP j (where, i and j represents any pair of TRPs of the wireless system that can communicate wireless reference signals between each other). One or more of the TRPs of the wireless system may be used as a reference TRPs for determining time offset of other TRPs using Method One, Method Two and other methods that can be derived therefrom. Likewise, while Method Three and Method Four above are used to determine time offset between TRP 2 and TRP 3 via TRP 1, the time offset between any pair of TRPs including TRP i and TRP j can be determined via another TRP k (where i, j, and k represent any triple of TRPs of the wireless system that can communicate wireless reference signals among on another). TRP k may be referred to as a reference TRP via which time offset between any other pair of TRPs (TRP i and TRP j) may be determined using Method Three, Method Four, and/or other methods that can be derived therefrom.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method performed by a network node for reference signal synchronization in a wireless network, comprising:
sending reference signal configuration information to a first transmission reception point (TRP 1) and a second transmission reception point (TRP 2) of the wireless network;
sending measurement requests to trigger the TRP 1 and/or the TRP 2 to perform timing measurements of reference signals communicated between the TRP 1 and the TRP 2 according to the reference signal configuration information;
receiving, from the TRP 1 and/or the TRP 2, measurement reports of the timing measurements; and
generating time offset information for synchronizing between the TRP 1 and the TRP 2.

2. The method of claim 1, wherein the reference signal configuration information comprises at least one of transmission periodicity, transmission radio resource information, sequence information, transmission and/or reception scheduling information, initialization time information of system frame number (SFN), or transmission and/or reception beam information of the reference signals communicated between the TRP 1 and the TRP 2.

3. The method of claim 2, wherein the transmission and/or reception scheduling information of each of the reference signals comprises at least one of an SFN, a subframe number, a slot number, a mini slot number, or a symbol number.

4. The method of claim 2, wherein the transmission radio resource information comprises at least one of radio frequency, radio frequency bandwidth, or sub-carrier spacing for each of the reference signals.

5. The method of claim 2, wherein the transmission and/or reception beam information of each of the reference signals comprises a spatial filter.

6. The method of claim 1, wherein each of the measurement requests comprises at least one of a measurement periodicity, a measurement type, a measurement time resolution, or a reference signal identifier.

7. The method of claim 6, wherein the measurement type indicates which timing values of the reference signals need to be measured and reported by the TRP 1 and TRP 2.

8. The method of claim 1, wherein the each of the measurement reports comprises at least one of a reference signal measurement time value, corresponding reference signal identifier, a measurement time stamp, a measurement quality metrics, or a measurement time resolution.

9. The method of claim 8, wherein measurement time stamp comprises at least one of a system frame number, a subframe number, a slot number, a mini slot number, a symbol number, or a symbol index.

10. The method of claim 1, wherein the reference signals as scheduled by the reference signal configuration information comprise:
a first reference signal (RS 1) transmitted from the TRP 1 at time $T_{trp1,RS1,tx}$ as measured by TRP 1 and received by the TRP 2 at time $T_{trp2,RS1,rx}$ as measured by TRP 2; and
a second reference signal (RS 2) transmitted from the TRP 2 at time $T_{trp2,RS2,tx}$ as measured by the TRP 2 and received by the TRP 1 at time $T_{trp1,RS2,rx}$ as measured by TRP 1.

11. The method of claim 10, wherein:
the measurement report from the TRP 1 comprises at least one of $T_{trp1,RS1,tx}$, $T_{trp1,RS2,rx}$, or $T_{trp1,RS2,rx}-T_{trp1,RS1,tx}$; and
the measurement report from the TRP 2 comprises at least one of $T_{trp2,RS2,tx}$, $T_{trp2,RS1,rx}$, or $T_{trp2,RS2,tx}-T_{trp2,RS1,rx}$.

12. The method of claim 11, wherein generating the time offset comprises generating the time offset for synchronizing the TRP 1 and the TRP 2 based on at least one of $T_{trp1,RS1,tx}$, $T_{trp1,RS2,rx}$, $T_{trp2,RS2,tx}$, and $T_{trp2,RS1,rx}$.

13. The method of claim 12, wherein the time offset is derived by the network node as $[(T_{trp2,RS1,rx}-T_{trp1,RS1,tx})-(T_{trp1,RS2,rx}-T_{trp2,RS2,tx})]/2$.

14. The method of claim 12, wherein the time offset is derived by the network node as $E_{sync\_12}=T_{trp1,RS2,rx}-T_{trp2,RS2,tx}-R_{12}/c$ or $E_{sync\_21}=T_{trp2,RS1,rx}-T_{trp1,RS1,tx}-R_{12}/c$, where $R_{12}$ denotes a distance between the TRP 1 and TRP 2, and c represents signal propagation speed of the reference signals between the TRP 1 and the TRP 2.

15. A method performed by a network node for reference signal synchronization in a wireless network, comprising:
   sending reference signal configuration information to a first transmission reception point (TRP 1), a second transmission reception point (TRP 2), and a third transmission reception point (TRP 3) of the wireless network;
   sending measurement requests to trigger the TRP 1, the TRP 2, and/or the TRP 3 to perform timing measurements of reference signals communicated between the TRP 1, and the TRP 2 and the TRP 3 according to the reference signal configuration information;
   receiving, from the TRP 1, TRP 2, and/or the TRP 3, measurement reports of the timing measurements; and
   generating time offset information for synchronizing the TRP 1, the TRP 2, and the TRP 3.

16. The method of claim 15, wherein the reference signals as scheduled by the reference signal configuration information comprise:
   a first reference signal (RS 1) transmitted from the TRP 1 at time $T_{trp1,RS1,tx}$ as measured by the TRP 1, and received by the TRP 2 at time $T_{trp2,RS1,rx}$ as measured by the TRP 2 and by the TRP 3 at time $T_{trp3,RS1,rx}$ as measured by the TRP 3;
   a second reference signal (RS 2) transmitted from the TRP 2 at time $T_{trp2,RS2,tx}$ as T measured by the TRP 2 and received by the TRP 1 at time $T_{trp1,RS2,rx}$ as measured by the TRP 1; and
   a third reference signal (RS 3) transmitted from the TRP 3 at time $T_{trp3,RS3,tx}$ as measured by the TRP 3 and received by the TRP 1 at time $T_{trp1,RS3,rx}$ as measured by the TRP 1.

17. The method of claim 16, wherein:
   the measurement report from the TRP 1 comprises at least one of $T_{trp1,RS1,tx}$, $T_{trp1,RS2,rx}$, or $T_{trp1,RS2,rx}-T_{trp1,RS1,tx}$;
   the measurement report from the TRP 2 comprises at least one of $T_{trp2,RS2,tx}$, $T_{trp2,RS1,rx}$, or $T_{trp2,RS2,tx}-T_{trp2,RS1,rx}$; and
   the measurement report from the TRP 3 comprises at least one of $T_{trp3,RS1,rx}$, $T_{trp3,RS3,tx}$, or $T_{trp3,RS3,tx}-T_{trp3,RS1,rx}$.

18. The method of claim 17, wherein generating the time offset comprises generating the time offset for synchronizing the TRP 2 and the TRP 3 based on at least one of $T_{trp1,RS1,tx}$, $T_{trp1,RS2,rx}$, $T_{trp2,RS2,tx}$, $T_{trp2,RS1,rx}$, $T_{trp3,RS3,tx}$, $T_{trp3,RS1,rx}$, and a reference signal time delay between RS 2 and RS 3 as measured by the TRP 1 and denoted by $T_{trp2,trp3,RSTD}$.

19. The method of claim 18, wherein the time offset for synchronizing the TRP 2 and the TRP 3 is derived by the network node as:

$$E_{sync\_32} = \frac{(T_{trp1,RS3,RS1} - T_{trp3,RS3,RS1}) - (T_{trp1,RS2,RS1} - T_{trp2,RS2,RS1})}{2} - T_{trp2,trp3,RSTD},$$

Where:
$T_{trp1,RS3,RS1}=T_{trp1,RS3,rx}-T_{trp1,RS1,tx}$;
$T_{trp3,RS3,RS1}=T_{trp3,RS3,tx}-T_{trp3,RS1,rx}$;
$T_{trp1,RS2,RS1}=T_{trp1,RS2,rx}-T_{trp1,RS1,tx}$; and
$T_{trp2,RS2,RS1}=T_{trp2,RS2,tx}-T_{trp2,RS1,rx}$.

20. The method of claim 18, the time offset for synchronizing the TRP 2 and the TRP 3 is derived by the network node as $E_{sync\_32}=(R_{13}-R_{12})/c-T_{trp2,trp3,RSTD}$, where:
   $R_{12}$ denotes a distance between the TRP 1 and TRP 2;
   $R_{13}$ denotes a distance between the TRP 1 and TRP 3; and
   c represents signal propagation speed of the reference signals between the TRP 1, the TRP 2, and the TRP 3.

* * * * *